(12) United States Patent
Cash

(10) Patent No.: US 6,386,817 B1
(45) Date of Patent: May 14, 2002

(54) APPARATUS AND METHOD FOR MOUNTING AND TRANSPORTING A WHEELCHAIR UPON A TOWING FRAME OF A VEHICLE

(76) Inventor: Wanda M. Cash, P.O. Box 1525, Roswell, GA (US) 30077

( * ) Notice: Subject to any disclaimer, the term of this patent is extended or adjusted under 35 U.S.C. 154(b) by 0 days.

(21) Appl. No.: 09/393,114

(22) Filed: Sep. 10, 1999

(51) Int. Cl.[7] ............................................. B60P 9/00
(52) U.S. Cl. ...................... 414/462; 414/541; 414/557; 414/674; 414/720
(58) Field of Search ........................... 414/921, 462, 414/541, 557, 786, 674, 673, 720

(56) References Cited

U.S. PATENT DOCUMENTS

| | | | | |
|---|---|---|---|---|
| 4,213,729 A | * | 7/1980 | Cowles et al. ............... | 414/462 |
| 4,685,860 A | * | 8/1987 | McFarland .................. | 414/720 |
| 4,772,164 A | * | 9/1988 | McFarland .................. | 414/462 |
| 4,775,282 A | * | 10/1988 | Van Vliet .................... | 414/462 |
| 4,786,072 A | * | 11/1988 | Girvin ........................ | 280/289 |
| 5,011,361 A | | 4/1991 | Peterson ...................... | 414/462 |
| 5,137,411 A | * | 8/1992 | Eul et al. ..................... | 414/462 |
| 5,199,842 A | | 4/1993 | Watt et al. ................... | 414/537 |
| 5,445,488 A | * | 8/1995 | Saucier et al. ............... | 414/546 |
| 5,482,424 A | | 1/1996 | Jones et al. .................. | 414/462 |
| 5,567,107 A | * | 10/1996 | Bruno et al. ................. | 414/462 |
| 5,791,858 A | | 8/1998 | Sasser ......................... | 414/462 |
| 5,816,763 A | | 10/1998 | Hamann et al. ............. | 414/462 |
| 5,853,278 A | | 12/1998 | Frantz ......................... | 414/462 |
| 6,056,251 A | * | 5/2000 | Knopp et al. ............... | 248/161 |
| 6,092,972 A | * | 7/2000 | Levi ............................ | 414/462 |

* cited by examiner

*Primary Examiner*—Joseph A. Fischetti
(74) *Attorney, Agent, or Firm*—Baker, Donelson, Bearman & Caldwell (57) ABSTRACT

A wheelchair carriage in which an upright support post detachably couples to a towing frame of a vehicle. A tubular housing slidably receives an end of the post and is biased against the post. An enclosure for holding a wheelchair includes a base member mounted to the housing, a platform mounted to a lower end of the base member, and a rack attached to an upper end of the base member. A lever has a lever arm pivotally attached to the upright support post, and a lever handle joined to the lever arm at a fulcrum pivotally attached to the housing. The lever handle, being moved in a first direction, bears against the fulcrum to move the enclosure to the first position for wheeling a wheelchair onto the platform. The lever handle, being moved in a second direction opposite to the first direction, raises the enclosure to the second position to a height sufficient to prevent the carriage from impeding the clearance of the vehicle for traveling.

20 Claims, 6 Drawing Sheets

APPARATUS AND METHOD FOR MOUNTING AND TRANSPORTING A WHEELCHAIR UPON A TOWING FRAME OF A VEHICLE

TECHNICAL FIELD

This invention relates generally to apparatuses and methods for mounting equipment to vehicles. More particularly, the present invention relates to apparatuses and methods for mounting and transporting wheelchairs upon towing frames of vehicles.

BACKGROUND OF THE INVENTION

For years, equipment has been mounted to vehicles using devices such as roof or hood mounted tracks for transporting bicycles, kayaks, luggage, ladders, and the like. In more recent years, devices for transporting objects have been developed for attachment to the tow frame or trailer hitch of a vehicle ordinarily used for towing large objects such as trailers, boats, and campers. For example, U.S. Pat. No. 5,791,858 provides a game skinning device that mounts to a trailer hitch for raising and lowering game animals. Also, U.S. Pat. No. 5,853,278 provides a cargo carrier including a platform hingedly attached to a trailer hitch.

Several devices have been used to attach wheelchairs to towing frames of vehicles. For example, U.S. Pat. No. 5,199,842 describes a rectangular box attached to a trailer hitch. A wheelchair is pushed on a ramp into the box for being enclosed and transported upon a trailer hitch. Also, U.S. Pat. No. 5,482,424 describes a rack for clamping a wheelchair and carrying the wheelchair upon the trailer hitch of a vehicle.

Wheelchairs are required for use by persons whose mobility is restricted. Wheelchairs are often cumbersome for carrying by a vehicle, but from necessity, must be carried. Mounting and transporting wheelchairs upon vehicles is difficult, particularly for wheelchair-dependent person.

While such devices for mounting wheelchairs to vehicles have provided users with increased opportunity for mobility, there are drawbacks to their use. Devices designed for mounting wheelchairs to vehicles require considerable coordination on the part of an operator to align the wheelchair with clamping mechanisms and with wheel wells in order to secure the wheelchair to the device. Also, such devices generally require considerable adjustments to accommodate wheelchairs of varying sizes and dimensions.

Accordingly, there remains a need in the art for a wheelchair carriage designed for safe, simple and efficient mounting of wheelchairs to the rear of a vehicle for transporting the same. It is to the provision of such that the present invention is directed.

SUMMARY OF THE INVENTION

The present invention meets the above-described need in the art by providing a wheelchair carriage and a method for mounting and transporting a wheelchair upon a towing frame of a vehicle. The wheelchair carriage comprises an upright support post having a first end adapted for detachably coupling to a towing frame of a vehicle, and a second end opposing the first end. A tubular housing defines an opening that slidably receives the second end of the upright support post. The housing is movable from a first position to a second position relative to the first end. The housing and the upright support post are biased against one another to the first position. An enclosure for holding a wheelchair comprises a base member mounted to the housing. The base member has a lower end and an upper end. A platform attaches to the lower end of the base member for supporting a wheelchair thereon. A rack attaches to the upper end of the base member for enclosing an upper portion of the wheelchair. The rack comprises a plurality of interconnected rods that define a closed loop. A lever slides the housing upon the upright support post. The lever has a lever arm pivotally attached to the upright support post and extending laterally therefrom. A lever handle joins to the lever arm at a fulcrum. The fulcrum pivotally attaches to the housing. the lever handle, being moved in a first direction, bears against the fulcrum to move the enclosure to the first position for wheeling a wheelchair onto the platform, and the lever handle, being moved in a second direction opposite to the first direction, raises the enclosure to the second position at a height sufficient to prevent the carriage from impeding the clearance of the vehicle for traveling.

The method for mounting a wheelchair to a vehicle comprises selectively gripping one of a plurality of handles attached to a lever pivotally mounted to an exterior portion of a vehicle. The handle is moved in a first direction to lower a platform relative to the vehicle from a raised position to a lowered position. A wheelchair is wheeled onto the lowered platform. One of the plurality of handles is selectively gripped and moved in a second direction opposite to the first direction to raise the platform from the lowered position to the raised position for traveling with the wheelchair mounted to the vehicle.

Objects, features and advantages of the present invention will become apparent upon reading the following detailed description of the disclosed embodiment of the present invention in conjunction with the appended drawings and claims.

DETAILED DESCRIPTION

Figure 1:
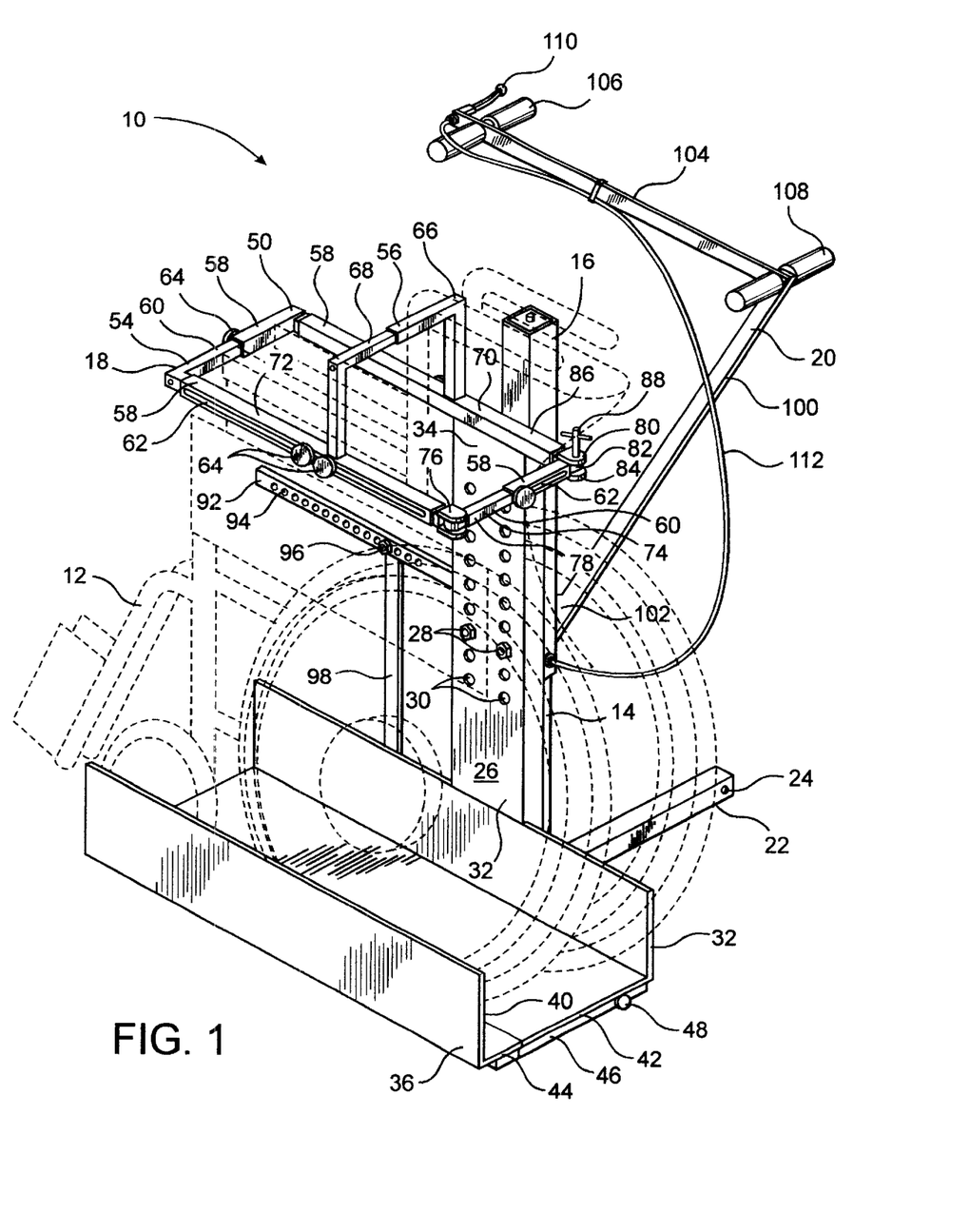
FIG. 1 is a perspective view of a wheelchair carriage readied for attachment to a trailer hitch of a vehicle with a wheelchair shown in phantom loaded into the carriage.
Figure 6:
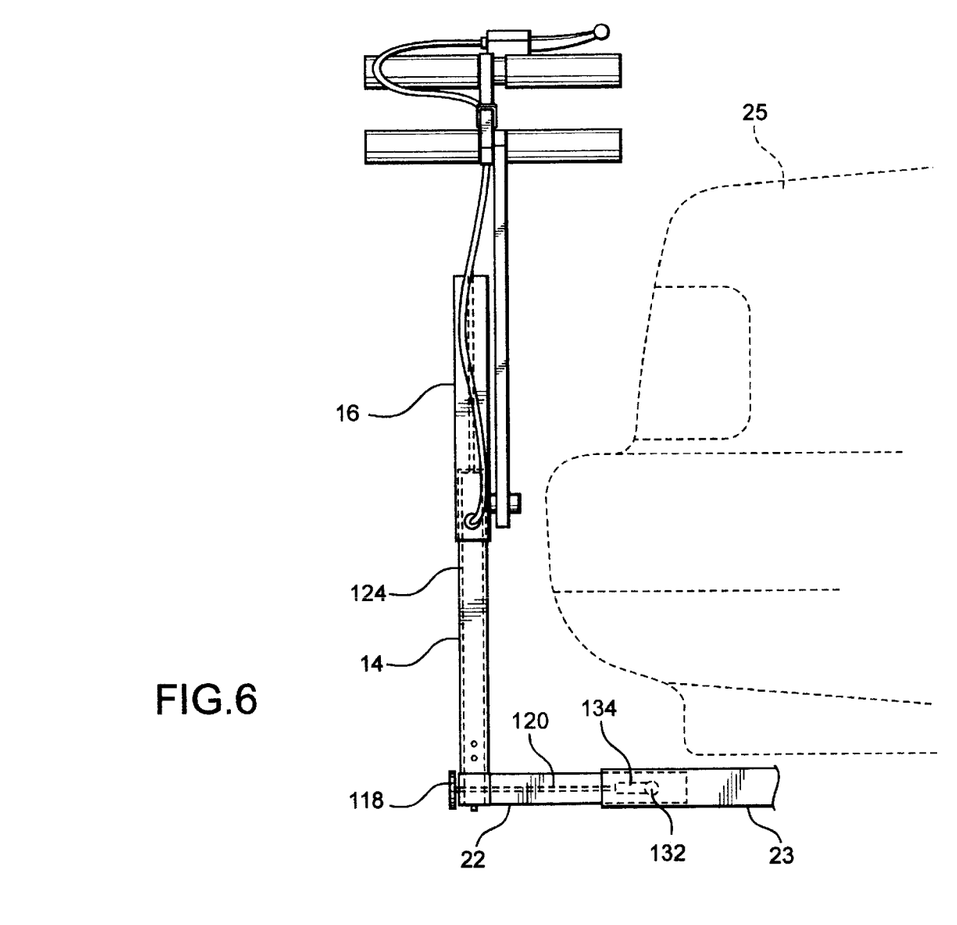
FIG. 6 is a side view of the wheelchair carriage illustrated in FIG. 1 coupled to a tow frame of a vehicle and excluding the enclosure for the wheelchair.

Referring now in more detail to the drawings in which like numerals refer to like parts throughout the several views, FIG. 1 is a perspective view of a wheelchair carriage 10 readied for attachment to a towing frame or trailer hitch of a vehicle with a wheelchair 12 shown in phantom lines loaded into the carriage. The carriage 10 includes an upright support post 14, a tubular housing 16, an enclosure 18 and a lever 20. The upright support post 14 is an elongated tube or length of pipe having a generally square cross-section. The upright support post 14 extends uprightly from a coupling member 22 adapted for attachment to a towing frame or trailer hitch 23 of a vehicle 25, as shown in FIG. 6. A hole 24 extends through the coupling member 22 for inserting a pin (not illustrated) to secure the coupling member to the vehicle towing frame 23.

The tubular housing 16 is an elongated piece of pipe having a generally square cross-section. The housing 16 defines an opening for slidably receiving an upright end of the upright support post 14. The housing 16 and the upright support post 14 are preferably biased against one another.

Figure 3:
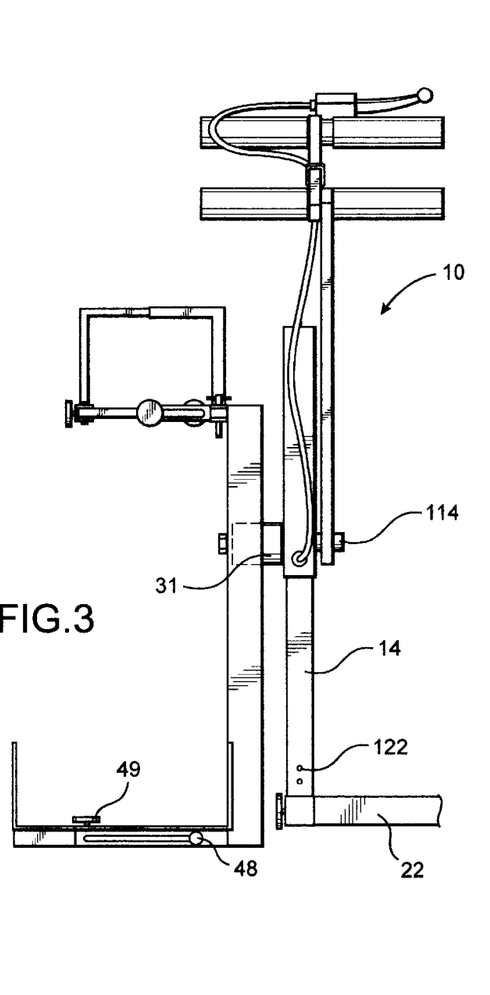
FIG. 3 is a side view of the wheelchair carriage illustrated in FIG. 2.

The enclosure 18 includes a base member 26, a platform 36 and a rack 50. The base member 26 is a substantially flat piece of metal that selectively mounts to the housing 16 using a pair of conventional bolts 28. A series of holes 30 extend through the base member 26. The bolts 28 extend through a pair of the holes 30. As shown in FIG. 3, a mounting bracket 31 is welded to the housing 16. The mounting bracket 31 has a pair of holes for receiving the bolts 28 and securing the base member 26 to the housing 16. The base member 26 has a lower end 32 and an upper end 34.

The platform 36 attaches to the lower end 32 of the base member 26. The platform 36 includes a forward retaining wall 38 and an opposing rearward retaining wall 40. The forward retaining wall 38 attaches to a forward plate 42 and extends uprightly from the forward plate. The rearward retaining wall 40 attaches to a rearward plate 44 and extends uprightly from the rearward plate. The forward retaining wall 38 and the forward plate 42 preferably comprise an L-shaped sheet of metal. The rearward retaining wall 40 and the rearward plate 44 preferably comprise an L-shaped sheet of metal. The forward retaining wall 38 attaches to the base member 26.

A pair of spaced-apart telescoping rods 46 join the forward plate 42 and the rearward plate 44 to one another. An adjustable knob, one of which is shown at 48, attaches to each of the telescoping rods 46 for selectively moving the rearward plate 44 relative to the forward plate 42. The other adjustable knob 49 is shown in FIG. 3. The knob 48 and 49 are preferably threaded for tightening the telescoping rods 46 against one another.

The rack 50 attaches to the upper end 34 of the base member 26. The rack 50 includes a plurality of interconnected telescoping rods that define a closed loop 54 and an archway 56. The telescoping rods of the rack 50 include a plurality of outer tubes 58 having ends adapted for slidably receiving one of a plurality of inner tubes 60. Each of the outer tubes 58 defines a channel 62 extending along a side of the outer tube 58. An adjusting knob 64 attaches to an end of each of the inner tubes 60 and extends through the channel 62 in the respective outer tube 58 in which the inner tube 60 slides. The knobs 64 may be tightened or loosened to selectively position the inner tubes 60 within the outer tubes 58, and thereby change the perimeter size of the rack 50.

The archway 56 is comprised of an outer tube 66 and an inner tube 68. The inner tube 68 is slidably received within the outer tube 66. The archway 56 extends between opposing sides 70 and 72 of the loop 54.

One side of the loop 54 comprises an adjustable gate 74 for opening and closing the loop. The adjustable gate 74 attaches with a hinge 76 to an end of an inner tube 78. The inner tube 78 is slidably received into an outer tube 80. An eyelet 82 attaches to an end of the outer tube 80 opposite the hinge 76. A U-shaped member 84 attaches to an opposing inner tube. This tube is slidably received into an outer tube 86 mounted to the upper end 34 of the base member 26. The U-shaped member 84 defines a pair of openings for alignment with the opening of the eyelet 82. A gate pin 88, or a pad lock, is received through the aligned eyelet 82 and the U-shaped member 84 to lock the gate 74 closed and secure the wheelchair 12 within the enclosure 18.

The lever 20 pivotally attaches to the upright support post 14. The lever 20 includes a lever arm 92 that extends laterally from the upright support post 14. A series of holes 94 extend through the lever arm 92 for a purpose discussed below. A conventional bolt 96 extends through a selected one of the holes 94 in the lever arm 92 to connect an elongate member 98 to the lever arm.

Figure 2:
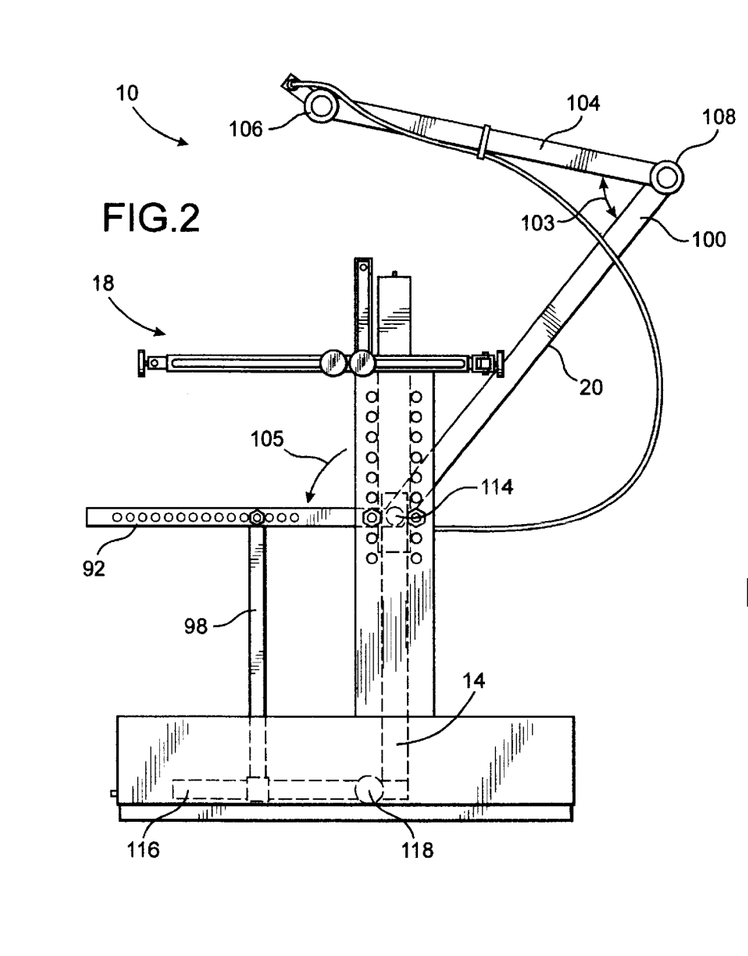
FIG. 2 is a front view of the wheelchair carriage illustrated in FIG. 1 in a first position.

A lever handle 100 joins to the lever arm 92 at a fulcrum 102. As shown in FIG. 2, a peg 114 pivotally attaches the fulcrum 102 of the lever 20 to the tubular housing 16. A shaft 104 attaches to the lever handle 100 opposite the fulcrum 102. Two pairs of handles 106 and 108 attach in spaced-apart relation to the shaft 104.

With reference to FIGS. 1 and 3, a brake lever 110 attaches to the shaft 104 near one of the handles 106. An end of a cable 112 mounts to the shaft 104 adjacent the brake lever 110. The cable 112 is preferably a conventional bicycle brake cable comprised of a outer conduit having an end mounted to the shaft 104 and an end opposite the shaft mounted to the housing 16. A wire extends within the conduit. The wire has an end that attaches to the brake lever 110 and an end opposite the brake lever that attaches to a brake pin. The brake pin extends through an opening in the side of the housing 16. The brake lever 110 is preferably biased to maintain the brake pin in an extended position through the opening in the tubular housing 16.

FIG. 2 is a front view of the wheelchair carriage 10 illustrated in FIG. 1 in a first position. A strut 116 extends outwardly from a lower portion of the upright support post 14. An end of the elongate member 98 opposite the lever arm 92 pivotally attaches to the strut 116. The strut 116 and the elongate member 98 are a connector that pivotally connects the lever arm 92 to the upright support post 14.

A shim knob 118 attaches to the strut 116 adjacent the upright support post 14. The shim knob 118 attaches to a threaded stick 120 that extends within the coupling member 22 as shown in FIG. 6. The intersection of the upright support post 14 and the strut 116 is adjacent and offset from the intersection of the coupling member 22 and the strut 116.

As illustrated in FIG. 2, the shaft 104 and the lever handle 100, in a preferred embodiment, intersect one another at an acute angle 103. The lever handle 100 and the lever arm 92 preferably intersect one another at an obtuse angle 105. However, the intersection of the shaft 104 and the lever handle 100 could be adjusted to angles other than an acute angle for adapting to the preferences of the user. Also, the lever 20 could be operated with the lever handle 100 and the lever arm 92 intersecting one another at angles other than an obtuse angle.

FIG. 3 is a side view of the wheelchair carriage 10 illustrated in FIG. 2. The upright support post 14 defines in a lower side portion a pair of second holes 122 for receiving the brake pin therethrough. The platform 36 is illustrated as raised in a first position near the height of the coupling member 22 so as not to impede the clearance of the vehicle for traveling.

Figure 4:
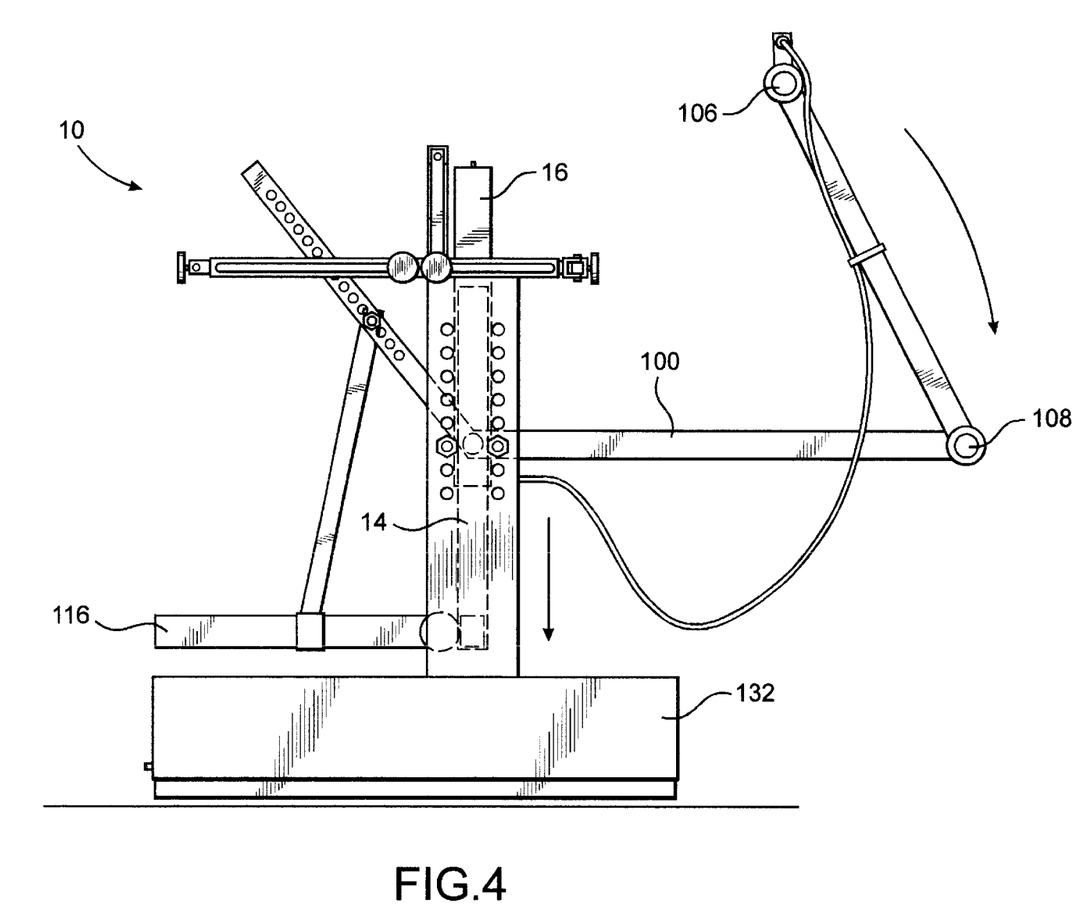
FIG. 4 is a front view of the wheelchair carriage illustrated in FIG. 1 in a second position.

FIG. 4 is a front view of the wheelchair carriage 10 illustrated in FIG. 1 in a second position. The lever handle 100 is moved downward to slide the tubular housing 16 on the upright support post 14 toward the strut 116.

Figure 5:
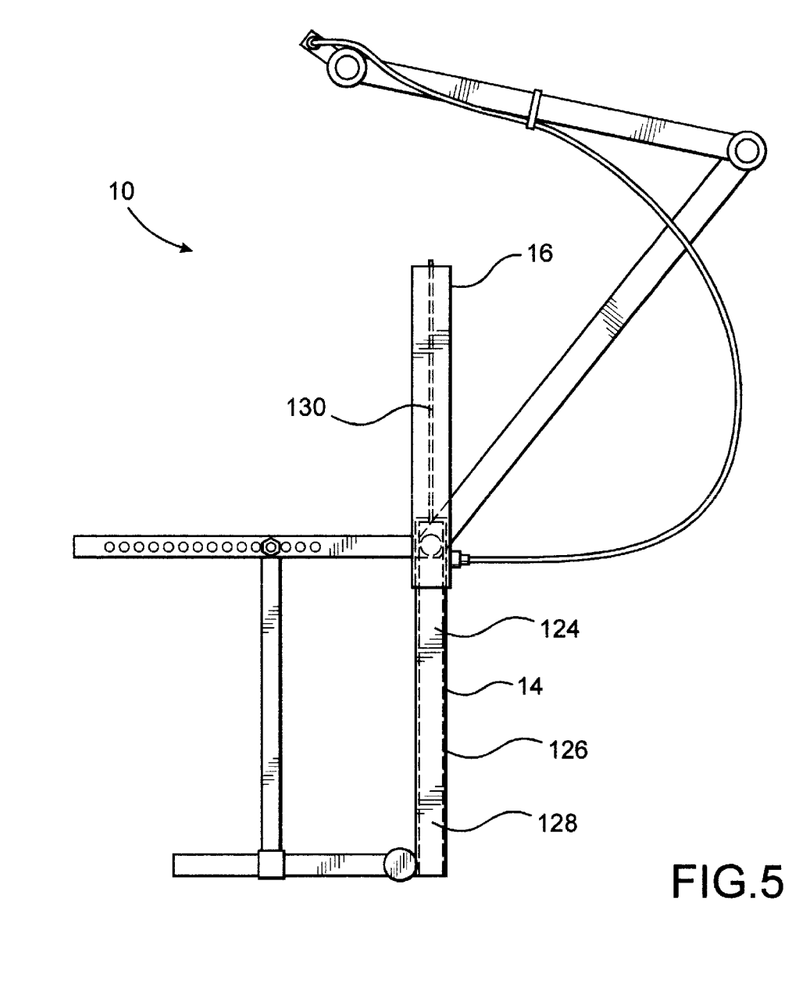
FIG. 5 is a front view of the wheelchair carriage illustrated in FIG. 2 excluding an enclosure for the wheelchair.

FIG. 5 is a front view of the wheelchair carriage 10 illustrated in FIG. 2 excluding the enclosure 18 for the wheelchair 12. A pressurized gas cylinder 124 is disposed within the interior of the upright support post 14 and the tubular housing 16. The gas cylinder 124 includes a cylindrical casing 126 defining a chamber 128. A piston conventionally mounts within the chamber 128. A piston rod 130 attaches to the piston and protrudes outwardly from the chamber 128. The casing 126 and the piston rod 130 attach respectively to the upright support post 14 and the tubular housing 16.

FIG. 6 is a side view of the wheelchair carrier 10 illustrated in FIG. 1 coupled to a tow frame 23 of a vehicle 25 and for purposes of clarity of illustration, excludes the enclosure 18 for the wheelchair 12. The coupling member 22 and the towing frame 23 each have a pair of holes for receiving a hitching pin 132 therethrough. The coupling member 22 preferably slides into the towing frame 23 of the vehicle 25 to align the holes in the coupling member 22 with those of the towing frame 23. A threaded insert member 134 threadably receives an end of the threaded stick 120 opposite the shim knob 118. Rotation of the shim knob 118 in a first direction secures the coupling member 22 to the hitching pin 132. Rotation of the shim knob 118 in an opposing direction releases the coupling member 22 from the hitching pin 132.

The operation of the wheelchair carriage 10 is understood with reference to FIGS. 1–6. Beginning with FIGS. 1–3 and FIGS. 5–6, the gas cylinder 124 normally biases the wheelchair carriage 10 in the first position and the upright support post 14 and the tubular housing 16 are biased against one another. With the wheelchair carriage 10 in the first position, one of the handles 106, 108 attached to the shaft 104 is selectively gripped. The gripped handle 106, 108 is moved in a first direction to lower the platform 36 relative to the vehicle from the first position to the second position shown in FIG. 4. This is accomplished because movement of the gripped handle 106, 108 in the first direction pushes the lever handle 100 downward against the fulcrum 102. In response, the lever arm 92 pivots about the bolt 96. As a result, the tubular housing 16 is forced to slide downward relative to the upright support post 14. This compresses the piston rod 130 into the chamber 128 of the gas cylinder 124.

The tubular housing 16 slides downward relative to the upright support post 14 until one of the lower holes 122 in the upright support post 14 aligns with the brake pin. Because the brake pin is biased to the extended position, the brake pin slides into the first of the holes 122 in the upright support post 14, thereby locking the tubular housing 16 and the upright support post 14 in the second position.

In the second position, the gate pin 88 is pulled from the U-shaped member 84. The gate 74 pivots about the hinge 76 to open the rack 50 for receiving an upper portion of the wheelchair 12.

The knobs 64 on the rack 50 are loosened to enable the inner tubes 60 to slide within the outer tubes 58. The inner tubes 60 are adjusted within the outer tubes 58 of the rack 50 to achieve the desired perimeter of the loop 54 for accommodating an upper portion of the wheelchair 12. The knobs 64 are then tightened to secure the perimeter of the loop 54.

The knobs 48 and 49 on the platform 36 are loosened to permit movement of the telescoping rods 46. The spacing of the forward plate 42 relative to the rearward plate 44 is then adjusted to a width sufficient to accommodate a lower portion of the wheelchair 12. The knobs 48 and 49 are then tightened to lock the telescoping rods 46 relative to one another. The platform 36 and the rack 50 are independently adjustable to accommodate wheelchairs of varying sizes.

The wheelchair 12 is then wheeled onto the platform 36 and into the rack 50. The gate 74 is closed. This is accomplished by pivoting the gate 74 to align the eyelet 82 with the pair of openings in the U-shaped member 84. Once aligned, the gate pin 88 is inserted through the eyelet 82 and the openings in the U-shaped member 84. This secures the upper portion of the wheelchair 12 in the rack 50 between the gate 74 and the archway 56.

With the wheelchair 12 in the enclosure 18, the wheelchair carriage 10 is returned to the first position. This is accomplished by gripping one of the plurality of handles 106, 108. The brake lever 110 is gripped and depressed to release the brake pin from the hole 122 in the upright support post 14. This releases the housing 16 relative to the post 14. The pressure of the gas cylinder 124 then pushes the piston rod 130 out of the chamber 128, thereby raising the platform 36 from the second position near the ground to the first position. The brake lever 110 is released to enable the brake pin to return to its biased position against the housing 14. As the carriage 10 returns to the first position, the brake pin aligns with a third hole preferably defined in an upper portion of the upright support post 14. The third hole receives the brake pin therein. This locks the upright support post 14 and the tubular housing 16 in the first position.

In a preferred embodiment, the force of the gas cylinder 124 is sufficient to raise the enclosed wheelchair 12 to the first position. Therefore, the force of the gas cylinder is greater than the combined weight of the enclosure 18, the tubular housing 16, the lever 20, and a wheelchair 12 secured to the enclosure so as to raise the platform 36 with the wheelchair 12 loaded thereon. If the force of the gas cylinder 124 is insufficient to raise the enclosed wheelchair 12, the handles 106 and 108 may be gripped and raised to assist the gas cylinder 124 in raising the platform 36. The force of the gas cylinder 124 should not be so great as to jolt or jerk the enclosure from the second position.

An operator may selectively grip and move either of the illustrated handles 106, 108 to move the lever 20 the range of motion necessary to lower and raise the platform 36 in relation to the ground. In an alternate embodiment, a plurality of spaced-apart handles attach to the shaft 104 for facilitating such movement of the lever 20. The operator may use the handles 106 and 108 sequentially as one would grip sequential rungs of a ladder and pull on them sequentially to climb or descend on the ladder with minimal bending of the operator's back to mount the wheelchair 12 to the vehicle.

It should be noted that the height of the towing frame 23 of the vehicle 25 relative to the ground affects the range of motion required to move the platform 36 between the first position and the second position. Also, the height of the platform 36 relative to the ground may be adjusted using the series of holes 30 in the base member 26. The hand brake lever 110 may be attached adjacent any of the handles 106 and 108 to accommodate the preferred grip of the operator.

In a preferred embodiment, the wheelchair carriage 10 including the upright support post 14, the tubular housing 16, the enclosure 18 and the lever 20 is made of steel or a similar metal. However, other materials, such as rigid plastic or fiberglass, may be used to construct the wheelchair carriage. Also, in a preferred embodiment, a gas cylinder is used to bias the housing and the upright support post against one another. However, any type of strong spring might be used so long as it is sufficient to lift the wheelchair 12 as well as the enclosure 18, the housing 16 and the lever 20 to a height sufficient to avoid impeding the clearance of the vehicle for traveling.

Further, it should be appreciated that the carriage 10 has been illustrated and described with reference to mounting and transporting wheelchairs. However, the carriage 10 could and should be used to mount and transport other devices such as scooters, bicycles and the like upon vehicles.

Figure 7:
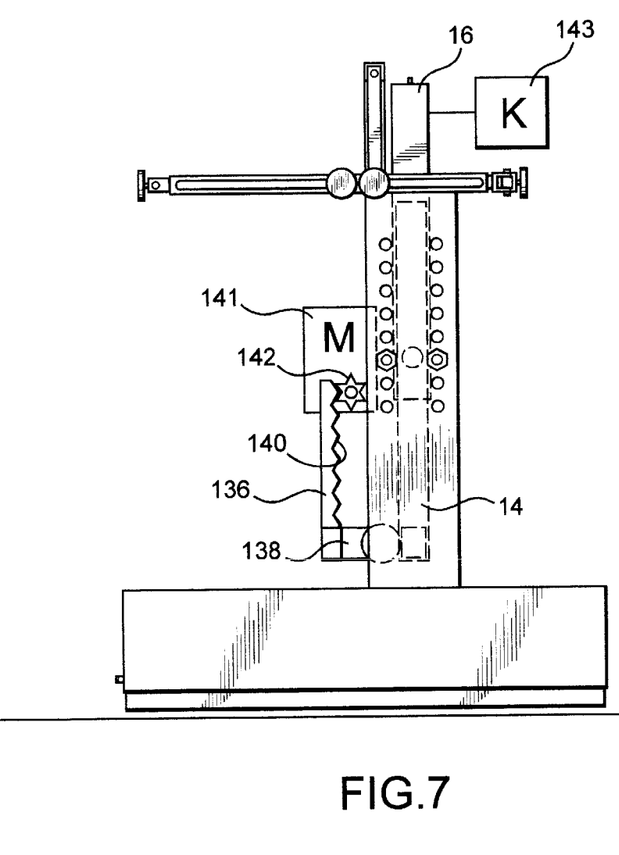
FIG. 7 is a front view of the wheelchair carriage illustrated in FIG. 4 in a motorized embodiment.

FIG. 7 is a front view of the wheelchair carriage illustrated in FIG. 4 in a motorized embodiment. A frame member 136 extends from a strut 138 attached to the upright support post 14. The frame member 136 includes a plurality of teeth 140 preferably facing the upright support post 14.

A motor 141 mounts laterally to the tubular housing 16. The motor 141 includes a pinion 142 for engaging the teeth 138 of the frame member 136. The motor 141 preferably includes several gears for varying the speed and the torque of the pinion 142. One such motor is a 32A-W PM DC gearmotor sold by the Bodine Electric Company of Chicago, Ill.

A keypad 143 attaches to the tubular housing 16 and electronically couples to the motor 141. The keypad 143 controls the operation of the motor 141 for raising and lowering the enclosure 18 between the first position and the second position. The keypad 143 preferably has a control for locking the motor 141 to hold the enclosure 18 in the first position and in the second position. In a preferred embodiment, at least one key of the keypad 143 must be depressed in order for the motor 141 to move the enclosure 18.

It thus is seen that a new wheelchair carriage is now provided that overcomes problems long associated with those of prior art. The present invention provides a carriage that readily attaches to the towing frame of a vehicle with independent adjustment of a rack for holding the upper portion of a wheelchair and of a platform for supporting the lower portion of a wheelchair, which carriage is conveniently raised and lowered by a user selectively grasping and moving reachable handles, and in a preferred embodiment including powered assistance to raise the wheelchair for traveling upon the vehicle. It should be understood however that many modifications, additions and deletions may be made thereto without departure from the spirit and scope of the invention as set forth in the following claims.

What is claimed is:

1. A wheelchair carriage for attachment to a towing frame of a vehicle, comprising:
   an upright support post having a first end detachably coupled to a towing frame of a vehicle, and a second end opposing said first end;
   a tubular housing defining an opening that slidably receives said second end of said upright support post, said tubular housing being movable from a first position to a second position relative to said first end, said tubular housing and said upright support post being biased against one another to said first position;
   an enclosure for holding a wheelchair, comprising:
      a base member mounted to said tubular housing, said base member having a lower end and an upper end;
      a platform attached to said lower end of said base member for supporting a wheelchair thereon; and
      a rack attached to said upper end of said base member for enclosing an upper portion of the wheelchair, said rack comprising a plurality of interconnected rods that define a closed loop;
   a lever for sliding said tubular housing upon said upright support post, said lever having a lever arm and a lever handle joined to said lever arm at a fulcrum, said fulcrum pivotally attached to said tubular housing, said lever arm extending laterally from said fulcrum; and
   a connector pivotally connecting said lever arm to said upright support post,
   whereby the lever handle, being moved in a first direction, bears against the fulcrum to move the enclosure from the first position to the second position for wheeling a wheelchair onto the platform, and the lever handle, being moved in a second direction opposite to the first direction, raises the enclosure to the second position at a height sufficient to prevent the carriage from impeding the clearance of the vehicle for traveling.

2. The wheelchair carriage as recited in claim 1, further comprising a pressurized gas cylinder for biasing said tubular housing and said upright support post against one another to said first position, said pressurized gas cylinder including a casing defining a chamber, a piston slidably mounted within said chamber, and a piston rod attached to said piston and protruding outwardly from said chamber, said casing and said piston rod attached respectively to said upright support post and said piston rod.

3. The wheelchair carriage as recited in claim 1, wherein said platform includes a forward retaining wall and an opposing rearward retaining wall, each extending uprightly from opposing sides of said platform.

4. The wheelchair carriage as recited in claim 1, wherein said platform comprises:
   a forward plate attached to said base member, said forward plate including a forward retaining wall extending upwardly at a first side;
   a rearward plate including a rearward retaining wall extending uprightly at an opposing side to said forward retaining wall; and
   a pair of telescoping interconnected rods slidably joining said forward plate and said rearward plate to one another for selectively moving said rearward plate relative to said forward plate from a first position near said forward plate to a second position spacedapart from said forward plate.

5. The wheelchair carriage as recited in claim 1, wherein said interconnected rods of said rack are selectively movable between a first position and a second position for enlarging said closed loop.

6. The wheelchair carriage as recited in claim 1, wherein one side of said loop comprises an adjustable gate hingedly attached to a distal end of one of said interconnected rods of said rack, for opening and closing said loop to allow entrance into said loop of a portion of a wheelchair.

7. The wheelchair carriage as recited in claim 1, wherein said rack further comprises an adjustable archway extending between opposing sides of said loop.

8. The wheelchair carriage as recited in claim 1, wherein said connector comprises a strut that protrudes from said upright support post and an elongate member that attaches to said strut and to an end of said lever arm opposite said fulcrum for moving said tubular housing between the first position and the second position relative to said upright support post.

9. The wheelchair carriage as recited in claim 1, wherein said lever arm extends along a first axis and said lever handle extends along a second axis that intersects said first axis at an oblique angle; and further comprising a shaft attached to said lever handle, said shaft extending along a third axis moveable relative to said second axis; and a plurality of spaced-apart hand grips attached to said shaft.

10. The wheelchair carriage as recited in claim 1, further comprising a plurality of spaced-apart hand grips attached to said lever handle.

11. The wheelchair carriage as recited in claim 10, further comprising a brake assembly attached to said housing and one of said hand grips for locking said housing and said upright support post together in said second position for loading the wheelchair upon the platform.

12. The wheelchair carriage as recited in claim 1, wherein said tubular housing defines a first hole adjacent said opening, said upright support post defines a plurality of second holes aligned with said first hole adjacent said first end, and further comprising a brake assembly including a brake lever that attaches adjacent one of said hand grips, a cable that attaches to said brake lever and to said housing adjacent said first hole, and a pin attached to said cable and extending through said first hole, said pin being biased in an extended position, whereby alignment of one of the second holes with the first hole permits the pin to extend through the second hole aligned with the first hole to stop sliding movement of the upright support post relative to the tubular housing, and depression of the brake lever causes the pin to retract from the second hole to permit sliding movement of the upright support post relative to the tubular housing.

13. A method for mounting a wheelchair to a vehicle using a wheelchair carriage providing
  an upright support post having a first end detachably coupled to a towing frame of a vehicle, and a second end opposing said first end;
  a tubular housing defining an opening that slideably receives said second end of said upright support post, said tubular housing being movable from a first position to a second position relative to said first end, said tubular housing and said upright support post being biased against one another to said first position;
  an enclosure for holding a wheelchair, comprising:
    a base member mounted to said tubular housing, said base member having a lower end and an upper end;
    a platform attached to said lower end of said base member for supporting a wheelchair thereon; and
    a rack attached to said upper end of said base member for enclosing an upper portion of the wheelchair, said rack comprising a plurality of interconnected rods that define a closed loop;
  a lever for sliding said tubular housing upon said upright support post, said lever having a lever arm, a lever handle joined to said lever arm at a fulcrum, and a plurality of hand grips attached to said lever handle opposite said fulcrum, said fulcrum pivotally attached to said tubular housing, said lever arm extending laterally from said fulcrum; and
  a connector pivotally connecting said lever arm to said upright support post,
  the method comprising the steps of:
    (a) selectively gripping one of a plurality of hand grips attached to the lever;
    (b) moving the lever handle in a first direction to lower the platform relative to the vehicle from a raised position to a lowered position;
    (c) wheeling a wheelchair onto the lowered platform; and
    (d) selectively gripping one of the plurality of hand grips and moving the lever handle in a second direction opposite to the first direction to raise the platform from the lowered position to the raised position for travelling with the wheelchair mounted to the vehicle.

14. The method as recited in claim 13, wherein step (b) the handle is moved in a first direction from a raised position to an intermediate position and a second one of the plurality of handles is selectively gripped and moved in the first direction the intermediate position to a lowered position.

15. The method as recited in claim 13, wherein step (d) a hand brake lever is depressed to enable movement of the handle in the second direction opposite to the first direction to raise the platform from the lowered position to the raised position for travelling with the wheelchair mounted to the vehicle.

16. A method of carrying a wheelchair on a carriage providing
  an upright support post having a first end detachably coupled to a towing frame of a vehicle, and a second end opposing said first end;
  a tubular housing defining an opening that slideably receives said second end of said upright support post, said tubular housing being movable from a first position to a second position relative to said first end, said tubular housing and said upright support post being biased against one another to said first position;
  an enclosure for holding a wheelchair, comprising:
    a base member mounted to said tubular housing, said base member having a lower end and an upper end;
    a platform attached to said lower end of said base member for supporting a wheelchair thereon; and
    a rack attached to said upper end of said base member for enclosing an upper portion of the wheelchair, said rack comprising a plurality of interconnected rods that define a closed loop;
  a lever for sliding said tubular housing upon said upright support post, said lever having a lever arm and a lever handle joined to said lever arm at a fulcrum, said fulcrum pivotally attached to said tubular housing, said lever arm extending laterally from said fulcrum; and
  a connector pivotally connecting said lever arm to said upright support post, the method comprising the steps of:
    (a) detachably coupling the first end of the upright support post to a towing frame of a vehicle,
    (b) moving the lever in a first direction to move the enclosure to the first position, and
    (c) wheeling a wheelchair onto the platform.

17. The method as recited in claim 16, further comprising a step (d) of moving the lever in a second direction opposing the first direction to raise the enclosure with the wheelchair on the platform to the second position to a height sufficient to prevent the enclosure from impeding the clearance of the vehicle for travelling.

18. The method as recited in claim 16, wherein step (b) the lever is moved by selectively gripping and sequentially pulling at least two of a plurality of handles attached to the lever in a first direction, and further comprising the steps (d) depressing a hand brake attached adjacent one of the plurality of handles to release the wheelchair enclosure from the first position; and (e) selectively gripping and sequentially exerting force against at least two of a plurality of handles attached to the lever in a second direction opposite the first direction to raise the enclosure with the wheelchair on the platform to the second position to a height sufficient to prevent the enclosure from impeding the clearance of the vehicle for travelling.

19. A wheelchair carriage for attachment to a towing frame of a vehicle, comprising
  an upright support post having a first end for detachably coupled to a towing frame of a vehicle, and a second end opposing said first end;
  a tubular housing defining an opening that slidably receives said second end of said upright support post, said tubular housing being movable from a first position to a second position relative to said first end, said tubular housing and said upright support post being biased against one another to said first position;

an enclosure for holding a wheelchair, comprising:
  a base member mounted to said tubular housing, said base member having a lower end and an upper end;
  a platform attached to said lower end of said base member for supporting a wheelchair thereon; and
  a rack attached to said upper end of said base member for enclosing an upper portion of the wheelchair, said rack comprising a plurality of interconnected rods that define a closeable loop; and means for selectively sliding said housing upon said upright support post between said first position wherein said enclosure is raised to a height sufficient to prevent the carriage from impeding the clearance of the vehicle for traveling and said second position wherein said enclosure is lowered to permit a wheelchair to be wheeled onto said platform.

20. The wheelchair carriage as recited in claim 19, wherein said means for selectively sliding said housing upon said upright support post comprises a lever having a lever arm and a lever handle joined to said lever arm at a fulcrum, said fulcrum pivotally attached to said housing, said lever arm extending laterally from said fulcrum, and a connector pivotally connecting said lever arm to said upright support post.

* * * * *

UNITED STATES PATENT AND TRADEMARK OFFICE
CERTIFICATE OF CORRECTION

PATENT NO. : 6,386,817 B1
DATED : May 14, 2002
INVENTOR(S) : Wanda M. Cash

It is certified that error appears in the above-identified patent and that said Letters Patent is hereby corrected as shown below:

Column 10,
Line 62, delete "for".

Column 11,
Line 9, delete "attached to said upper end of said base member for enclosing an upper portion of the wheelchair, said rack".
Line 12, after "loop" insert -- for enclosing an upper portion of the wheelchair, said rack attached to said upper end of said base member --.

Signed and Sealed this

Twenty-ninth Day of October, 2002

Attest:

Attesting Officer

JAMES E. ROGAN
Director of the United States Patent and Trademark Office